US008972586B2

(12) United States Patent
Ezell et al.

(10) Patent No.: US 8,972,586 B2
(45) Date of Patent: Mar. 3, 2015

(54) BYPASSING OR REDIRECTING A COMMUNICATION BASED ON THE FAILURE OF AN INSERTED APPLICATION

(71) Applicants: Joel Ezell, Broomfield, CO (US); Kurt Haserodt, Westminster, CO (US)

(72) Inventors: Joel Ezell, Broomfield, CO (US); Kurt Haserodt, Westminster, CO (US)

(73) Assignee: Avaya Inc., Basking Ridge, NJ (US)

( * ) Notice: Subject to any disclaimer, the term of this patent is extended or adjusted under 35 U.S.C. 154(b) by 276 days.

(21) Appl. No.: 13/630,200

(22) Filed: Sep. 28, 2012

(65) Prior Publication Data

US 2014/0095723 A1 Apr. 3, 2014

(51) Int. Cl.
*G06F 15/16* (2006.01)

(52) U.S. Cl.
USPC ............ 709/227; 709/220; 709/223; 709/238

(58) Field of Classification Search
None
See application file for complete search history.

(56) References Cited

U.S. PATENT DOCUMENTS

2006/0176805 A1* 8/2006 Peters .......................... 370/228
2013/0054806 A1* 2/2013 Francis et al. ................ 709/226

* cited by examiner

*Primary Examiner* — Ario Etienne
*Assistant Examiner* — Clayton R Williams
(74) *Attorney, Agent, or Firm* — Sheridan Ross P.C.

(57) ABSTRACT

The system and method allow enhanced capabilities for Session Initiation Protocol (SIP) dialogs (communication sessions) between SIP devices. The SIP dialogs have applications that are inserted into the SIP dialog such as a Back-to-Back User Agent (B2BUA) or a proxy application. After the initial dialog is established and these applications fail or become unavailable, the system and method allow the applications to be bypassed or have the SIP dialog redirected to an alternative application. This provides a better user experience because the SIP dialog (e.g., a SIP telephone call) will not be dropped if the application fails mid-dialog.

20 Claims, 8 Drawing Sheets

BYPASSING OR REDIRECTING A COMMUNICATION BASED ON THE FAILURE OF AN INSERTED APPLICATION

TECHNICAL FIELD

The systems and methods that relate to communication systems and in particular to providing more extensive dialog protection.

BACKGROUND

There are systems that can detect a failure of a communication system. In the event that one of the communication systems fails, another communication system can take over for the failed communication system. Some systems can minor every communication that is sent and then resume existing communications based on detecting a failure. However, where the failover communication system is distributed to provide a more robust solution, minoring does not work effectively due to delays in a network.

The Session Initiation Protocol (SIP) usually works in a distributed environment. Existing SIP solutions can detect a failover and redirect new SIP dialogs to the failover communication system. However, if an existing SIP dialog has already been established, with existing solutions, the existing SIP dialog will time out and fail. This problem is exacerbated further when proxy applications and Back-to-Back User Agents (B2BUAs) are inserted into the dialog to provide additional services such as enhanced caller ID or call recording. Under current solutions, if the inserted proxy application or B2BUAs fail, the existing SIP dialog also fails. Failing an existing SIP dialog is not an ideal solution. What is needed are solutions that will continue work for an established SIP dialog when the proxy application or B2BUA fails.

SUMMARY

Systems and methods are provided to solve these and other problems and disadvantages of the prior art. The system and method allow enhanced capabilities for Session Initiation Protocol (SIP) dialogs (communication sessions) between SIP devices. The SIP dialogs have applications that are inserted into the SIP dialog such as a Back-to-Back User Agent (B2BUA) or a proxy application. After the initial dialog is established and these applications fail or become unavailable, the system and method allow the applications to be bypassed or have the SIP dialog redirected to an alternative application. This provides a better user experience because the SIP dialog (e.g., a SIP telephone call) will not be dropped if the application fails mid-dialog.

In an embodiment, the application is mandatory (i.e., the application is necessary to continue the dialog), the application is a first Back-to-Back User Agent (B2BUA), and the SIP dialog is redirected through an alternative application. A dialog identifier for a dialog between a second SIP device and a first B2BUA is inserted into a message that is sent between the first B2BUA and a session manager. The session manager detects that the first B2BUA is no longer available. The session manager uses the dialog identifier to redirect the SIP dialog through an alternative application that is a second B2BUA.

In an embodiment, a route set and a contact Uniform Resource Identifier (URI) for the communication path between the second SIP device and the first B2BUA are also inserted into a message. This information is used to redirect a mid-dialog message to an alternative B2BUA.

In an embodiment, the preferred application is mandatory, the preferred application is a first Back-to-Back User Agent (B2BUA), and the first SIP dialog is redirected through the alternative application. To accomplish this, a dialog ID, a first route set, and a first contact Uniform Resource Identifier (URI) for a communication path between the second SIP device and the first B2BUA are inserted into a message sent between the first B2BUA and the first SIP device. The first SIP device detects that the first B2BUA is no longer available. The first SIP device using the first dialog ID, the first route set, and the first contact URI redirects the SIP dialog through an alternative that is a second B2BUA.

In an embodiment, the first B2BUA inserts a second dialog ID, a second route set, and a second contact Uniform Resource Identifier (URI) for a communication path between the first SIP device and the first B2BUA into a SIP INVITE message that is sent between the first B2BUA and the second SIP device.

In an embodiment, the preferred application is a proxy application, the preferred application is not mandatory, and the preferred application is bypassed.

In an embodiment, the preferred application is a proxy application and the preferred application is not mandatory. The SIP dialog is redirected through an alternative application in response to the alternative application being unavailable.

In an embodiment, the preferred application is a proxy application and the preferred application is not mandatory. The first SIP dialog is redirected through an alternative application if the alternative application is available.

In an embodiment, the preferred application is a Back-to-Back User Agent (B2BUA), the preferred application is not mandatory, and an alternative application is not available. A first dialog ID, a first route set, and a first contact Uniform Resource Identifier (URI) for a communication path between the second SIP device and the B2BUA is inserted into a message sent between the B2BUA and a first SIP device. The system and method detect that the B2BUA is no longer available. The first dialog ID, the route set, and the first contact URI are used to bypass the B2BUA.

In an embodiment, a B2BUA inserts a second dialog ID, a second route set, and a second contact Uniform Resource Identifier (URI) for a communication path between the first SIP device and the first B2BUA into a SIP INVITE message sent between the first B2BUA and the second SIP device.

In an embodiment, the second dialog ID further comprises a TO header and the TO header is pre-populated.

DETAILED DESCRIPTION

Figure 1:
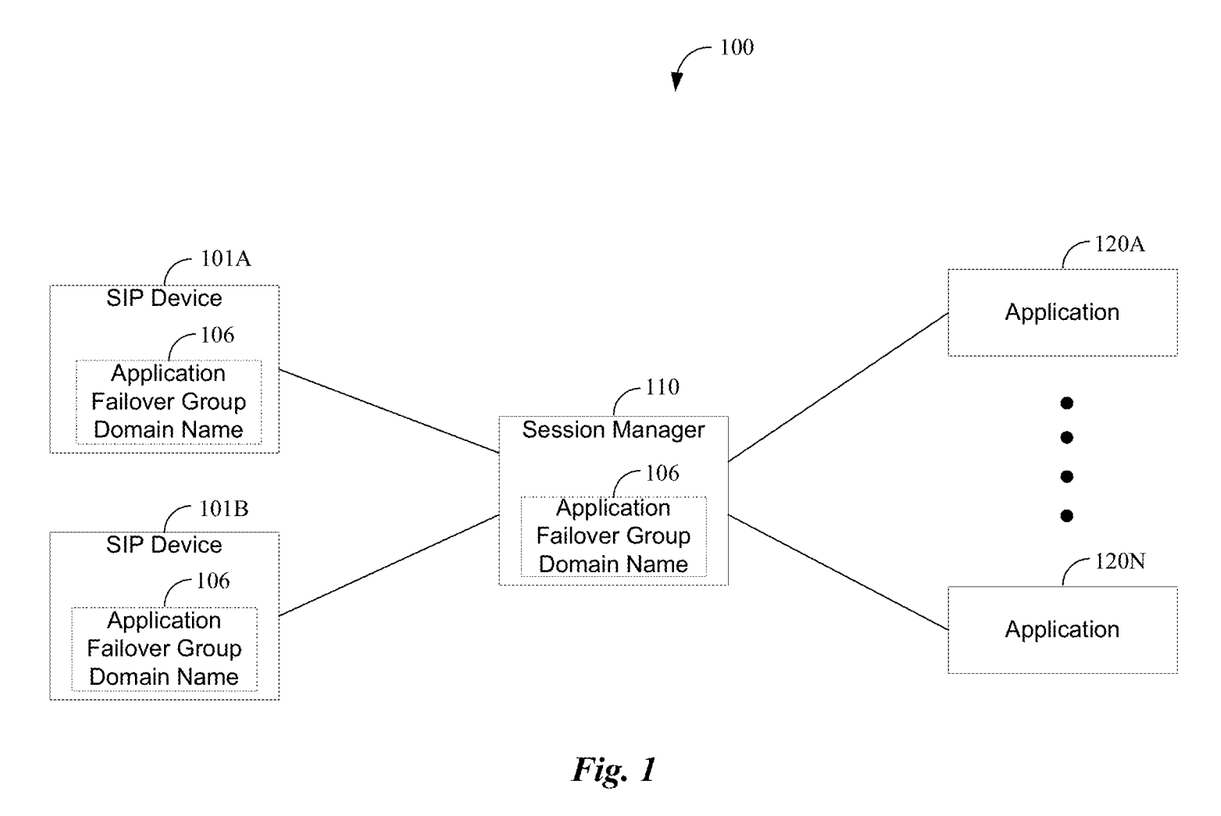
FIG. 1 is a block diagram of a first illustrative system for redirecting a Session Initiation Protocol (SIP) dialog or bypassing an application based upon a failure of an application.

FIG. 1 is a block diagram of a first illustrative system 100 for redirecting a Session Initiation Protocol (SIP) dialog or bypassing an application based upon a failure of an application. The first illustrative system 100 comprises SIP devices 101A and 101B, a session manager 110, and applications 120A-120N.

The SIP device 101 may be any device that can communicate with session manager 110, such as a Personal Computer (PC), a telephone, a video system, a cellular telephone, a Personal Digital Assistant (PDA), a tablet device, a notebook device, a server, a router, and/or the like. FIG. 1 only shows two SIP devices 101A-101B. However, the system of FIG. 1 may comprise any number of SIP devices 101. The SIP devices 101A-101B are shown directly connected to session manager 110. However, in other embodiments, SIP devices 101A-101B may be connected to session manager 110 via a network (not shown), such as the Internet, a Wide Area Network (WAN), a Local Area Network (LAN), the Public Switched Telephone Network (PSTN), a packet switched network, a circuit switched network, a cellular network, a combination of these, and the like. The SIP devices 101A-101B may use a variety of protocols, such as Ethernet, Internet Protocol (IP), Session Initiation Protocol (SIP), Voice over IP (VoIP) network, Integrated Services Digital Network (ISDN), and the like.

The SIP devices 101A-101B may also comprise an application failover group domain name 106. The application failover group domain name 106 is a listing of a priority of applications (See FIG. 8) that can be used by the session manager 110 or the SIP devices 101A-101B to redirect an active SIP dialog in case of a failed application 120. For example, the failover group domain name 106 may list the application 120A as the primary application and the application 120N as an alternative application. If application 120A fails while a SIP dialog is active, the session manager 110 or the SIP devices 101A-101B may use the application failover group domain name 106 to determine that the application 120N is the alternative application. The session manager 110 or the SIP devices 101A-101B can redirect the active SIP dialog to the application 120N or alternatively, bypass the application 120A. The application failover group domain name 106 may, depending on implementation, may be included in any of the SIP devices 101A-101B or in the session manager 110. The SIP devices 101A-101B and/or the session manager 110 gets the application failover group domain name 105 from a Uniform Resource Identifier (URI) in the SIP message. A Domain Name Server (not shown) helps to resolve the failover group domain name to an IP address or a Fully Qualified Doman Name (FQDN).

The session manager 110 can be any hardware/software that can support routing and/or handling of SIP messages such as a router, a server, a Private Branch Exchange (PBX), a proxy server, a gateway, a network switch, a communication system, various combinations of these, and the like. The session manager 110 is shown as a single entity. However, the session manager 110 may comprise a variety of components and be distributed within a network or across multiple networks. Although the session manager 110 is shown as a single session manager 110, the session manager 110 may comprise any number of session managers 110 that may be distributed across multiple networks.

The session manager 110, as used herein, may include any switch or server that is capable of controlling signaling flows for one or multiple users in a communication network. It may be authoritative for certain user groups within a communication network or may be configured to handle communication sessions for any user in a communication network. The session manager may also be configured to help two or more SIP devices 101 exchange messages for the purposes of negotiating and establishing a media path directly between the SIP devices 101.

The applications 120A-120N can be any application that can be inserted into a SIP dialog and/or media path. For example, the application 120 may provide enhanced caller ID services, recording services, call blocking services, call routing services, mid-call announcement services, and/or the like. The application 120 may be a proxy application, a Back-to-Back User Agent (B2BUA), and the like. The applications 120A-120N may be located on different servers, in different networks, co-located with the session manager 110, in a container located on the same device as the session manager 110, in the same container as the session manager 110, and/or the like. A SIP dialog may have multiple applications 120 inserted into the SIP dialog.

The SIP device 101A can be used to establish a SIP dialog via the session manager 110 to the SIP device 101B. Likewise, the SIP device 101B can be used to establish a SIP dialog via the session manager 110 to the SIP device 101A (or any number of other SIP devices 101). A SIP dialog may comprise a single communication device 101. For example, the SIP device 101A can establish a SIP dialog with application 120A to provide a dictation service. A SIP dialog may comprise a variety of different communication types, such as a voice call, a video call, a multi-media stream, an instant message session, an email communication, a Real Time Protocol (RTP) stream, and/or the like. The SIP dialog can comprise the SIP signaling messages, the media messages (e.g., a Real time Protocol (RTP) stream, the full communication between two SIP devices 101 that includes a B2BUA, a communication between a SIP device 101 and a B2BUA, and/or the like. For example, a SIP dialog can include the SIP signaling messages and/or the video stream for a video call between SIP devices 101A and 101B.

The session manager 110 is configured to establish a SIP dialog between the SIP device 101A and the SIP device 101B. The application 120A (the preferred application) is configured to be inserted into the communication path of the SIP dialog. For example, application 120A may be a proxy application that provides enhanced caller ID services, that is inserted into the call path between the SIP device 101A and the SIP device 101B. In application failover group domain name 106 (optional), the application 120A is listed as the preferred application and the application 120N is listed as the alternative application.

The SIP device 101A or the session manager 110 are configured to, while the SIP dialog is active, detect that the application 120A is unavailable. The application 120A may be unavailable for various reasons, such as a hardware failure of the application 120A, a software failure of the application 120A, a network failure, maintenance of the application 120A, and/or the like. The session manager 110 and/or the SIP device 101A can detect that the application 120A is unavailable in various ways, such as, detecting that the application 120A failed to respond to a SIP message within or less than a defined timeout-period, by not getting a response to a ping of the application 120, and/or the like.

In response to detecting that the application 120A is unavailable, the SIP device 101A and/or the session manager 110 may redirect the SIP dialog through a different application, such as application 120N. The SIP device 101A and/or the session manager 110 can redirect the SIP dialog through the other application 120N by using the application failover group domain name 106 that lists the other application 120N as being the alternate application. The application 120N can keep state of the application 120A. The SIP device 101A and/or the session manager 110 can use a domain service to look up the address of the application 120N. Redirecting the SIP dialog to the application 120N may cause the service provided by the application 120A to not be provided during the rest of the SIP dialog. Alternatively, based on the functionality of the application 120A, the functionality of application 120A may be preserved by application 120N for the rest of the SIP dialog.

Alternatively, the SIP device 101A and/or the session manager 110 may bypass the preferred application 120A. This typically occurs when the alternative application 120N is unavailable. However, this is not required and may vary based on configuration. For example, the SIP device 101A and/or the session manager 110 may automatically bypass the preferred application 120A when the preferred application 120A is not available. In other alternatives, there may not be an alternative application 120N (i.e., the system 100 does not use application failover group domain names 106).

An application 120 may be considered mandatory. Mandatory defines whether the application 120 is required or not required during the SIP dialog. If an application 120 is not mandatory, the application 120 may be bypassed if the application 120 fails while the SIP dialog is active. If the application 120 is mandatory and an alternative application 120 is not available, the session manager 110 will fail any mid dialog requests. This will likely result in the failure of the dialog.

In cases where the application 120A is a Back-to-Back User Agent (B2BUA), the SIP dialog actually comprises two SIP dialogs: 1) a SIP dialog from the SIP device 101A to the application 120A, and 2) a SIP dialog from the application 120A and the SIP device 101B. As a result, the session manager 110 does not know that there is a SIP dialog between the SIP devices 101A and 101B. Likewise, the SIP devices 101A and 101B only know of their SIP dialog with the application 120A. Because of this problem, the SIP device 101A, the SIP device 101B, and the session manager 110 are unable to redirect the SIP dialog to the application 120N when the application 120A becomes unavailable.

To solve this problem, in an embodiment where the application 120A is a B2BUA and is mandatory, the application 120A is configured to insert a dialog identifier (and optionally a route set (or route set header) and contact Uniform Resource Identifier (URI) if session manager 110 does not store them) for the SIP dialog between the SIP device 101B and the application 120A into a message sent to the session manager 110 (e.g., in a SIP 180 RINGING or 200 OK message that is a response to a SIP INVITE sent from the SIP device 101A) that ultimately is destined for the SIP device 101A. Also note that the SIP 180 RINGING or the 200 OK message will also contain a dialog identifier, a route set, and a contact URI for the SIP dialog between the SIP device 101A and the application 120A. This information is also inserted into a SIP INVITE that is sent from application 120A to SIP device 102B (to complete the SIP dialog from communication device 101A to 101B). The message already contains a dialog identifier for the SIP dialog between SIP device 101A and the application 120A. The session manager 110 receives the message containing both the dialog identifiers (and optionally the route set header and contact URI) for both the SIP dialogs. The session manager 110, upon detecting the unavailability of application 120A can now redirect the SIP dialog to the application 120N using the dialog ID, the route set header, and the contact URI for the SIP dialog between the SIP device 101B and the application 120A.

In an alternative embodiment, where the application 120A is a B2BUA and is mandatory, application 120A may be configured to insert a dialog identifier, a route set header, and a first contact Uniform Resource Identifier (URI) for the SIP dialog between the SIP device 101B and the application 120A into a message sent to the SIP device 101A (e.g., in a SIP 180 RINGING or 200 OK message that is a response to a SIP INVITE sent from the SIP device 101A). The SIP device 101A receives the message containing the dialog identifier, the route set header, and the first contact URI. The SIP device 101A, upon detecting the unavailability of application 120A can now redirect the SIP dialog to the application 120N. This is accomplished by the SIP device 101A redirecting the SIP dialog to the application 120N. The application 120N can now use the SIP dialog containing the dialog identifier, the route set header, and the first contact URI to reconstruct the SIP dialog or forward messages as necessary.

In a similar manner, the application 120A, upon receiving a SIP INVITE from the SIP device 101A inserts a dialog identifier, route set header, and a first contact URI for the SIP dialog between the SIP device 101A and the application 120A. At this point, application 120A pre-populates a To tag (normally the To tag is empty at this point) in the dialog identifier. The SIP INVITE is then sent to the SIP device 101B. The SIP device 101B now has the information necessary to redirect the SIP dialog to the application 120N in a similar manner as the SIP device 101A.

In an embodiment, where the application 120A is a proxy application and is not mandatory, the application 120A may be bypassed. When application 120A is bypassed, SIP messages are no longer sent to the application 120A or to an alternative application 120N. This is accomplished on a message-by-message basis. The SIP device 101A, the SIP device 101B, or the session manager 110, upon detecting that the application 120A is no longer available (or if configured to automatically bypass), can bypass the application 120A. Bypassing application 120A can be accomplished because there is only a single dialog between the SIP device 101A and the SIP device 101B. The session manager 110, the SIP device 101A, and the SIP device 101B have all the necessary information (i.e., the route set header, the dialog identifier, and the URI of the other contact for the dialog) to route messages and bypass the application 120A.

Where the application 120A is a proxy application, the proxy application may or may not be mandatory, and the alternative application 120N is available, the SIP dialog can be redirected through the alternative application 120N. Upon detecting that the primary application 120A is unavailable, the session manager 110, the SIP device 101A, or the SIP device 101B can redirect the SIP dialog through the alternative application 120N by using the application failover group domain name 106. If the SIP device 101A or the SIP device 101B performs the redirection, it may populate the address of application 120N in place of the application failover group domain name 106 in the Route header corresponding to application 120A. If, on the other hand, the session manager 110 performs the redirection, it need not replace the Route header containing the application failover group domain name 106 for application 120A. It can instead send the message to the alternate IP address corresponding to application 120N while leaving the Route header intact.

In an embodiment, where the application 120A is a B2BUA and is not mandatory, the application 120A may be configured to insert a dialog identifier, a route set header, and a first contact Uniform Resource Identifier (URI) for the SIP dialog between the SIP device 101B and the application 120A into a message sent to the SIP device 101A (e.g., in a SIP 180 RINGING or 200 OK message that is a response to a SIP INVITE sent from the SIP device 101A). The SIP device 101A receives the message containing the dialog ID, the route set header, and the first contact URI. The SIP device 101A, upon detecting the unavailability of application 120A can now redirect the SIP dialog to the application 120N. This is accomplished by the SIP device 101A redirecting the SIP dialog to the application 120N. The application 120N can now use the SIP dialog containing the dialog identifier, the route set header, and the first contact URI to reconstruct the SIP dialog or forward messages as necessary.

In a similar manner, application 120A, upon receiving the SIP INVITE from SIP device 101A inserts a dialog ID, a route set header, and a first contact URI for the SIP dialog between the SIP device 101A and the application 120A. At his point, the application 120A pre-populates a To tag (normally the To tag is empty at this point) in the dialog identifier. The SIP invite is then sent to the SIP device 101B. The SIP device 101B now has the information necessary to redirect the SIP dialog to application 120N in a similar manner as SIP device 101A.

Figure 2:
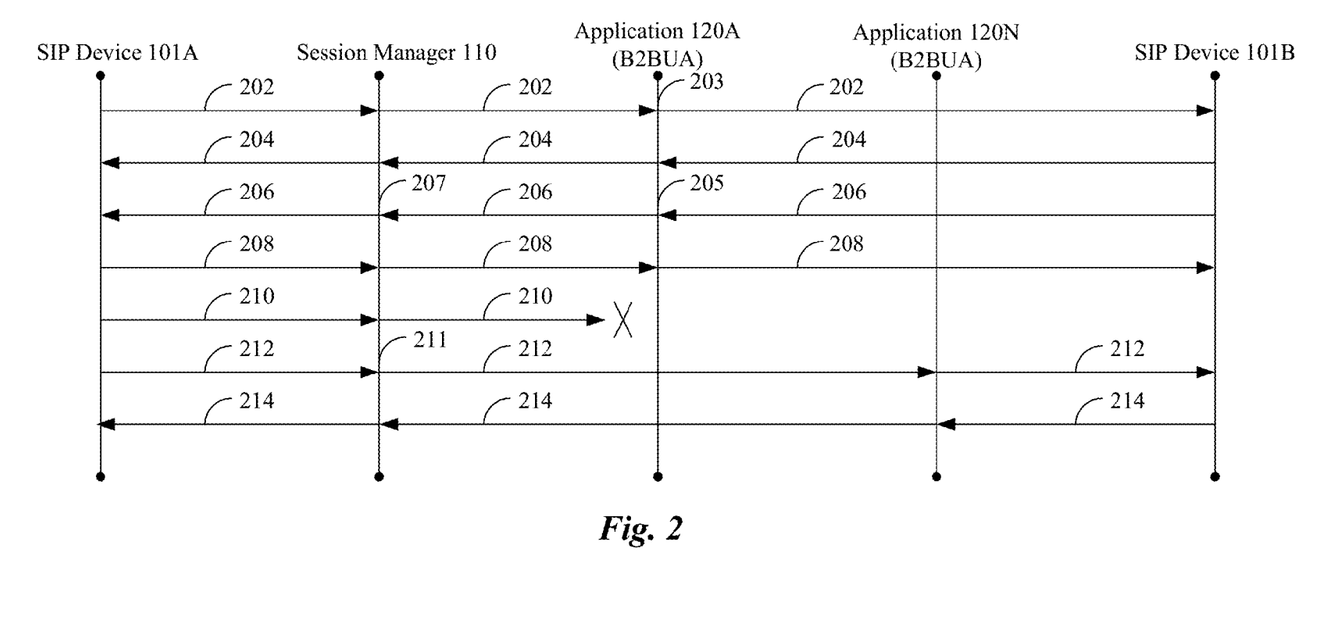
FIG. 2 is a flow diagram of a method for redirecting a Session Initiation Protocol (SIP) dialog upon a failure of an application that is a Back-to-Back User Agent (B2BUA).

FIG. 2 is a flow diagram of a method for redirecting a Session Initiation Protocol (SIP) dialog upon a failure of an application that is a Back-to-Back User Agent (B2BUA). Illustratively, the SIP devices 101A-101B, the session manger 110, and the applications 120A-120N are stored-program-controlled entities, such as a computer or processor, which performs the method of FIGS. 2-7 and the processes described herein by executing program instructions stored in a tangible computer readable storage medium, such as a memory or disk. Although the methods described in FIGS. 2-7 are shown in a specific order, one of skill in the art would recognize that the steps in FIGS. 2-7 may be implemented in different orders and/or be implemented in a multi-threaded environment. In addition, some of the messages shown in FIGS. 2-7 may not show all the SIP messages that may be sent and received during a SIP dialog. For example, some SIP ACK messages are not shown.

The process starts when a SIP INVITE 202 is sent from the SIP device 101A. The SIP INVITE 202 is sent to the session manager 110. The SIP INVITE 202 is sent to the application 120A, which in this embodiment is a B2BUA. The application 120A inserts 203 a dialog identifier, a route set, a contact URI, and optionally a via header for the SIP dialog between the SIP device 101A and the application 120A. The SIP INVITE 202 is sent to the SIP device 101B. The SIP device 101B responds to the SIP INVITE 202 by sending a 180 RINGING message 204 to the application 120A. The application 120A sends the 180 RINGING message 204 to the session manager 110. The session manager 110 sends the 180 RINGING message 204 to the SIP device 101A.

The SIP device 101B also sends a 200 OK message 206 to the application 120A. The application 120A inserts 205 a dialog identifier (and possibly a contact Uniform Resource Identifier (URI) and a route set header) for a dialog between the SIP device 101B and the application 120A into the 200 OK message 206. Step 205 could also be implemented in the 180 RINGING message 204. If the message is mid-transaction (i.e., a 180 RINGING message), in addition to storing the previous information, the via header would also be stored (at least until the transaction completes). The via header along with the other information would be used to establish the SIP dialog. The 200 OK message 206 with the inserted dialog identifier is sent to the session manager 110. The session manager 110 may store 207 the dialog identifier. Storing the dialog identifier may be necessary when the application 120A cannot pre-populate the To tag. Alternatively, the session manager 110 may run in a stateless mode. This is where the SIP device 101A and 101B send the information (the dialog identifier, the contact URI, the route set header, and optionally the via header) in all the SIP messages. This can be accomplished by populating the required information in parameters on the Record-Route header for the session manager or the application. Standard SIP devices would then store the information in the route set and populate it in Route headers on any subsequent messages. The session manager 110 can use this information by just looking at the messages (i.e., for a message that the application 120 failed to respond to). The 200 OK message 206 is sent to the SIP device 101A.

An in-dialog message 210 is sent from the SIP device 101A to session manger 110 (the in-dialog message can also originate from the SIP device 101B instead). The in-dialog message can be an ACK request to a 2xx INVITE response, an ACK request for a 3xx-6xx INVITE response, an in-dialog INVITE request, an in-dialog non-INVITE request, a provisional response, a 2xx response to INVITE, a 3xx-6xx response to INVITE, a final response to an out-of-dialog non-INVITE request, a final response to an in-dialog non-INVITE request including but not limited to PRACK requests, a request or response message of any kind received from an alternate session manager in the failover group that is not the session manager that sent the previous message of any kind. The session manager 110 sends the in-dialog message 210 to the application 120A. However, the application 120A is unavailable. The session manager 110 detects 211 that the application 120A is unavailable. For example, by implementing a timer based on sending the in-dialog message 210 to the application 120A or based on an earlier message that timed out on a different dialog.

The SIP device 101A resends the in-dialog message 212 (also based on a timeout) to the session manager 110. The session manager 110 redirects the resent in-dialog message 212 to the application 120N. The session manager 110 uses the application failover group domain name 106 to identify that the application 120N is the alternative application. The session manager 110 redirects the in-dialog message using the application failover group domain name. The session manager 110 can get the dialog identifier, the contact URI, the route set header from the messages sent by the SIP device 101A and 101B, and optionally the via header (each side sending information for the dialog of the other side). The application 120N sends the redirected message 212 to the SIP device 101B.

Alternatively if the SIP devices 101A and 101B are to redirect the SIP dialog, the SIP device 101B, upon detecting that the route set has changed, sends a response 214 to the in-dialog message 212 to the application 120N. The application 120N sends the response message 214 to the session manger 110. The session manager 110 sends the response message 214 to SIP device 101A.

Figure 3:
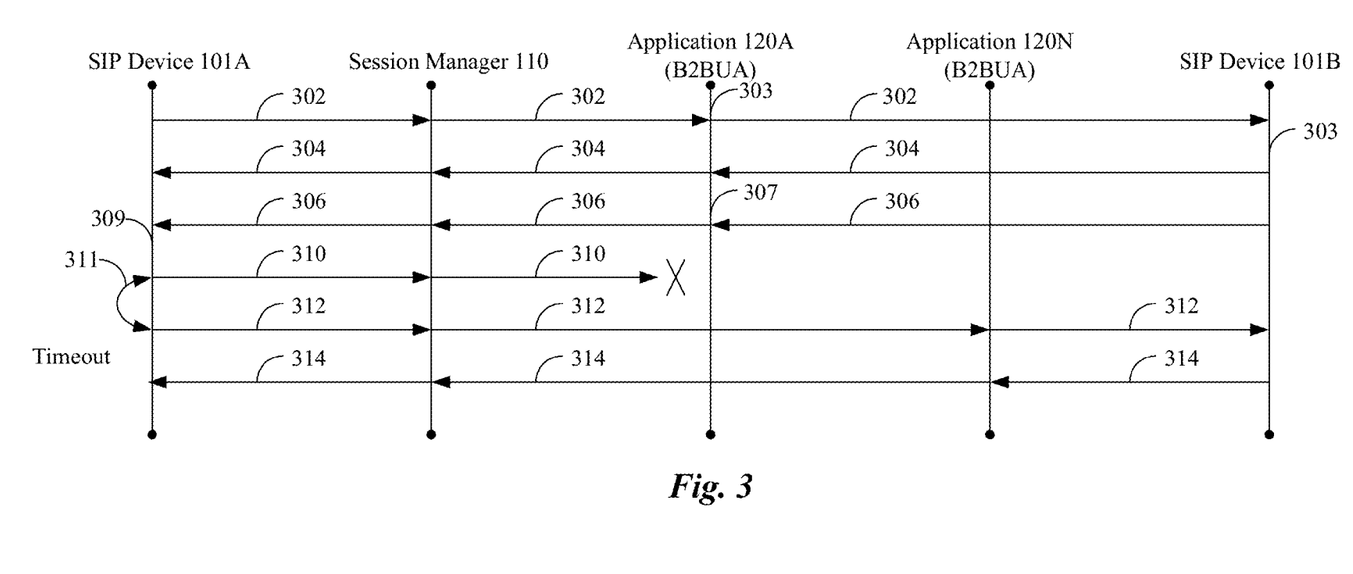
FIG. 3 is a flow diagram of a method for redirecting a Session Initiation Protocol (SIP) dialog upon a failure of an application that is a Back-to-Back User Agent (B2BUA).

FIG. 3 is a flow diagram of a method for redirecting a Session Initiation Protocol (SIP) dialog upon a failure of an application that is a Back-to-Back User Agent (B2BUA). The process starts when a SIP INVITE 302 is sent from the SIP device 101A. The SIP INVITE 302 is sent to the session manager 110. The SIP INVITE 302 is sent to the application 120A, which in this embodiment is a B2BUA. The application 120A may insert 303 a dialog ID, a rout set header, and a contact URI for the communication path between the SIP device 101A and the application 120A into the SIP INVITE 302. A TO field in the dialog ID can be pre-populated. The SIP INVITE 302 is sent to the SIP device 101B. The SIP device 101B stores 303 the dialog ID, the route set header, and the contact URI. The stored information can be used by the SIP device 101B to redirect an in-dialog message if the application 120A is unavailable (based on the application failover group domain name 106).

The SIP device 101B responds to the SIP INVITE 302 by sending a 180 RINGING message 304 to the application 120A. The application 120A sends the 180 RINGING message 304 to the session manager 110. The session manager 110 sends the 180 RINGING message 304 to the SIP device 101A.

The SIP device 101B also sends a 200 OK message 306 to the application 120A. The application 120A inserts 307 a dialog identifier, a contact Uniform Resource Identifier (URI), and a route set header for a dialog between the SIP device 101B and the application 120A into the 200 OK message 306. Step 307 may alternatively be accomplished in the 180 RINGING message 304. The 200 OK message 306 with the inserted information is sent to the session manager 110. The 200 OK message 306 with the inserted information is sent to the SIP device 101A. The SIP device 110A receives the 200 OK message with the dialog identifier, the contact Uniform Resource Identifier (URI), and the route set header for a dialog between the SIP device 101B and the application 120A. The SIP device 101A stores 309 this information so that the SIP device 101A can use this information to redirect the SIP dialog to the application 120N (based on the application failover group domain name 106).

An in-dialog message 310 is sent from the SIP device 101A to the session manger 110. The session manager 110 sends the in-dialog message 310 to the application 120A. However, the application 120A is unavailable. The SIP device 101A detects that the application 120A is not available based on a timeout 311. For example, by implementing a timer based on sending the in-dialog message 310 to the application 120A and not receiving a response.

The SIP device 101A resends the in-dialog message 312 to the session manager 110. The resent in-dialog message 312 is resent based on the session ID, the route set header, and the client URI of the dialog between the application 120A and the SIP device 101B that was stored in step 309. The session manager 110 sends resent in-dialog message 312 to the application 120N. The application 120N sends the resent in-dialog message 312 to the SIP device 101B.

The SIP device 101B, upon detecting that the route set has changed, sends a response 314 to the in-dialog message 312 to the application 120N. The application 120N sends the response message 314 to the session manger 110. The session manager 110 sends the response message 314 to the SIP device 101A.

Figure 4:
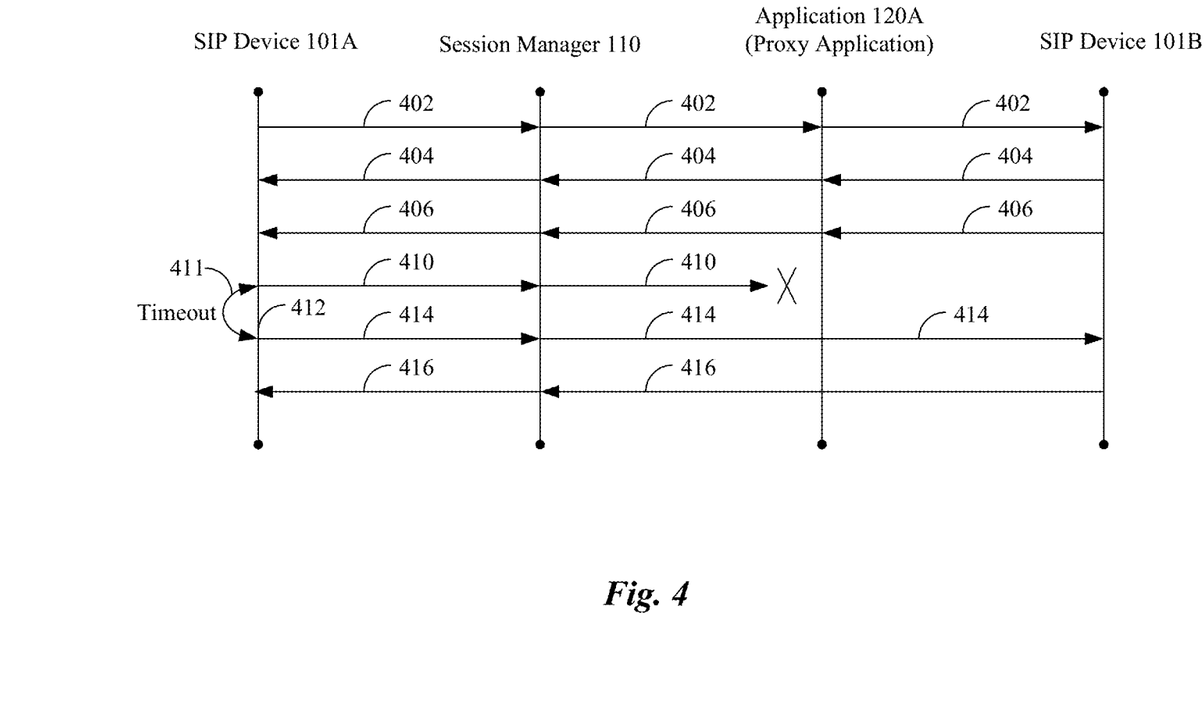
FIG. 4 is a flow diagram of a method for bypassing a non-mandatory proxy application.

FIG. 4 is a flow diagram of a method for bypassing a non-mandatory proxy application. The process starts when a SIP INVITE 402 is sent from the SIP device 101A. The SIP INVITE 402 is sent to the session manager 110. The SIP INVITE 402 is sent to the application 120A, which in this embodiment is a proxy application. The SIP INVITE 402 is sent to the SIP device 101B.

The SIP device 101B responds to the SIP INVITE 402 by sending a 180 RINGING message 404 to the application 120A. The application 120A sends the 180 RINGING message 404 to the session manager 110. The session manager 110 sends the 180 RINGING message 404 to the SIP device 101A.

The SIP device 101B also sends a 200 OK message 406 to the application 120A. The 200 OK message 406 is sent to the session manager 110. The 200 OK message 406 is sent to the SIP device 101A. The SIP device 110A receives the 200 OK message 406.

An in-dialog message 410 is sent from the SIP device 101A to the session manger 110. The session manager 110 sends the in-dialog message 410 to the application 120A. However, the application 120A is unavailable. The SIP device 101A detects that the application 120A is not available based on a timeout 411. For example, by implementing a timer based on sending the in-dialog message 310 to the application 120A and not receiving a response.

The SIP device 101A, upon detecting that the application 120A is unavailable, changes 412 the route set by removing the application 120A from the route set. Since the application is a proxy application, the SIP device 101A has the full route set to the SIP device 101B. Likewise, the SIP device 101B also has the full route set and can change the route set in like manner.

Figure 5:
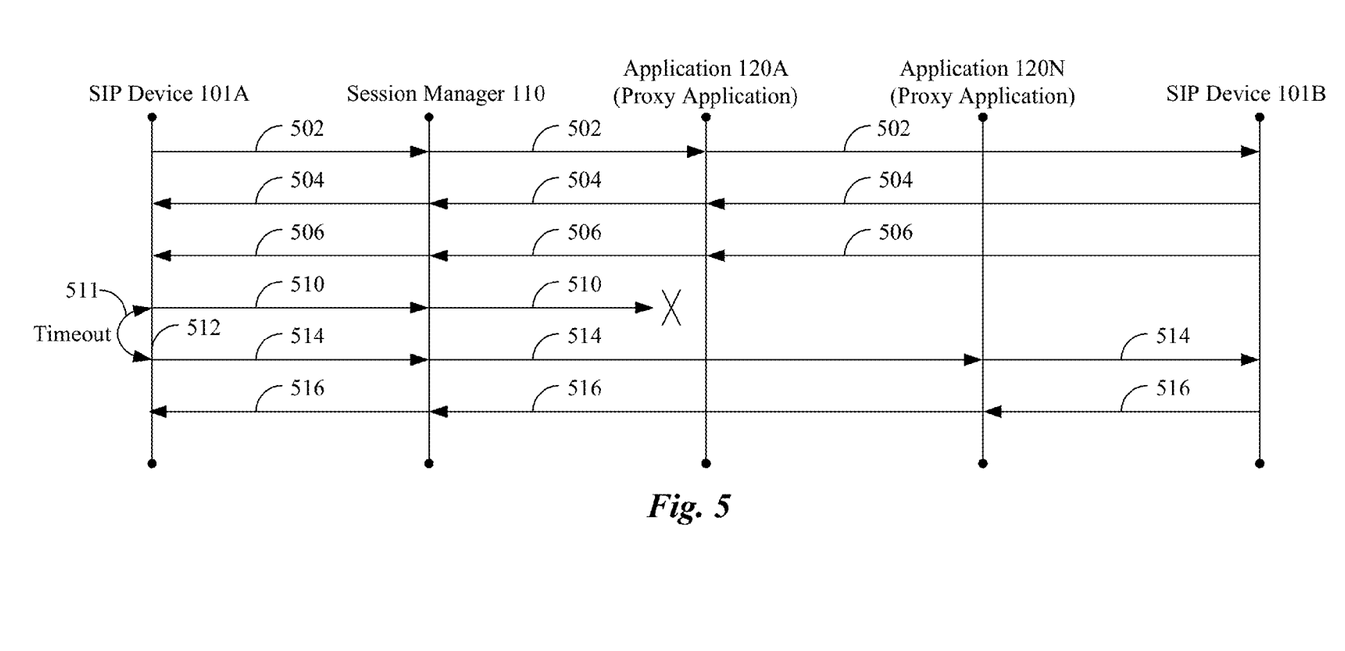
FIG. 5 is a flow diagram of a method for redirecting a Session Initiation Protocol (SIP) dialog upon a failure of a proxy application.

The SIP device 101A resends the in-dialog message 414 to the session manager 110. The session manager 110, using the new route set, sends the resent in-dialog message 414 to the SIP device 101B. Thus, bypassing the application 120A. The SIP device 101B, upon detecting that the route set has changed, sends a response message 416 to the resent in-dialog message 414 to the session manager 110. The session manager 110 sends the response message 416 to the SIP device 101A. FIG. 5 is a flow diagram of a method for redirecting a Session Initiation Protocol (SIP) dialog upon a failure of a proxy application. The process starts when a SIP INVITE 502 is sent from the SIP device 101A. The SIP INVITE 502 is sent to the session manager 110. The SIP INVITE 502 is sent to the application 120A, which in this embodiment is a proxy application. The SIP INVITE 502 is sent to the SIP device 101B. The SIP device 101B responds to the SIP INVITE 502 by sending a 180 RINGING message 504 to the application 120A. The application 120A sends the 180 RINGING message 504 to the session manager 110. The session manager 110 sends the 180 RINGING message 504 to the SIP device 101A.

The SIP device 101B also sends a 200 OK message 506 to the application 120A. The application 120A sends the 200 OK message 206 to the session manager 110. The 200 OK message 506 is sent to the SIP device 101A.

An in-dialog message 510 is sent from the SIP device 101A to the session manger 110. The session manager 110 sends the in-dialog message 510 to the application 120A. However, the application 120A is unavailable. The session manager 110 or the SIP device 101A detects 511 that the application 120A is unavailable. For example, by implementing a timer based on sending the in-dialog message 510 to the application 120A. The SIP device 101A or the session manager 110 based on detecting that the application 120A is unavailable, looks at the application failover group domain name 106 to determine that application 120N is the alternative application. The SIP device 101A or the session manger 110 redirects 512 in-dialog message by changing the route set by replacing the address of the application 120A with the address of the application 120N. The SIP device 101A or the session manager 110 resends the in-dialog message 514 with updated route set to the application 120N. The application 120N sends the resent in-dialog message 514 to the SIP device 101B.

Figure 6:
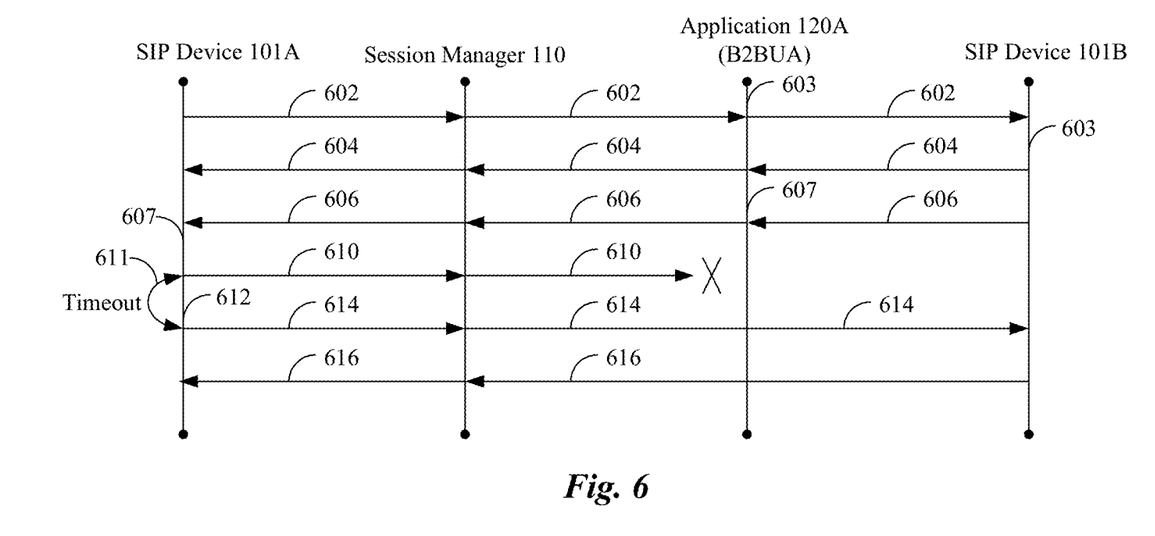
FIG. 6 is a flow diagram of a method for bypassing a Back-to-Back User Agent (B2BUA).

The SIP device 101B upon detecting that the route set has changed, sends a response message 516 to the in-dialog message 514 to the application 120N. The application 120N sends the response message 516 to the session manger 110. The session manager 110 sends the response message 516 to SIP device 101A. FIG. 6 is a flow diagram of a method for bypassing a Back-to-Back User Agent (B2BUA). The process starts when a SIP INVITE 602 is sent from the SIP device 101A. The SIP INVITE 602 is sent to the session manager 110. The SIP INVITE 602 is sent to the application 120A, which in this embodiment is a B2BUA. The application 120A may insert 603 a dialog ID, a rout set header, and a contact URI for the communication path between the SIP device 101A and the application 120A into the SIP INVITE 602. A TO field in the dialog ID can be pre-populated. The SIP INVITE 502 is sent to the SIP device 101B. The SIP device 101B stores 603 the dialog ID, the route set header, and the contact URI. The stored information can be used by the SIP device 101B to bypass the application 120A if the application 120A becomes unavailable.

The SIP device 101B responds to the SIP INVITE 602 by sending a 180 RINGING message 604 to the application 120A. The application 120A sends the 180 RINGING message 604 to the session manager 110. The session manager 110 sends the 180 RINGING message 604 to the SIP device 101A.

The SIP device 101B also sends a 200 OK message 606 to the application 120A. The application 120A inserts 607 a dialog identifier, a contact Uniform Resource Identifier (URI), and a route set header for a dialog between the SIP device 101B and the application 120A into the 200 OK message 606. Step 607 may alternative be performed in the 180 RINGING message 604. The 200 OK message 606 with the inserted information is sent to the session manager 110. The 200 OK message 606 with the inserted information is sent to the SIP device 101A. The SIP device 110A receives the 200 OK message 606 or the 180 RINGING message 604 with the dialog identifier, the contact Uniform Resource Identifier (URI), and the route set header for a dialog between the SIP device 101B and the application 120A. The SIP device 101A stores 607 this information so that the SIP device 101A can bypass the application 120A if the application 120A is unavailable. The SIP device 101A (or the session manager 110) changes a request URI to be the inserted contact URI. The SIP device 101A (or the session manager 110) populates the route set with the inserted route set. Note that if the route set was sent by propagating the "other side" record-route headers then no action will be required by the bypassing SIP device 101A (or the session manager 110). A call-ID header, a To tag, and a From tag are replaced by the dialog ID.

An in-dialog message 610 is sent from the SIP device 101A to the session manger 110. The session manager 110 sends the in-dialog message 610 to the application 120A. However, the application 120A is unavailable. The SIP device 101A or the session manager 110 detects that the application 120A is not available based on a timeout 611 (could also be a timeout in session manager 110).

The SIP device 101A or the session manager 110 resends the in-dialog message 612 to the session manager 110. The resent in-dialog message 612 is resent based on the session ID, the route set header, and the client URI of the dialog between the application 120A and the SIP device 101B. The session manager 110 sends resent in-dialog message 614 to the SIP device 101B. Thus, the application 120A is bypassed. The SIP device 101B, upon detecting that the route set has changed, sends a response 616 to the in-dialog message 614 to the session manager 110. The session manager 110 sends the response message 616 to the SIP device 101A.

Figure 7:
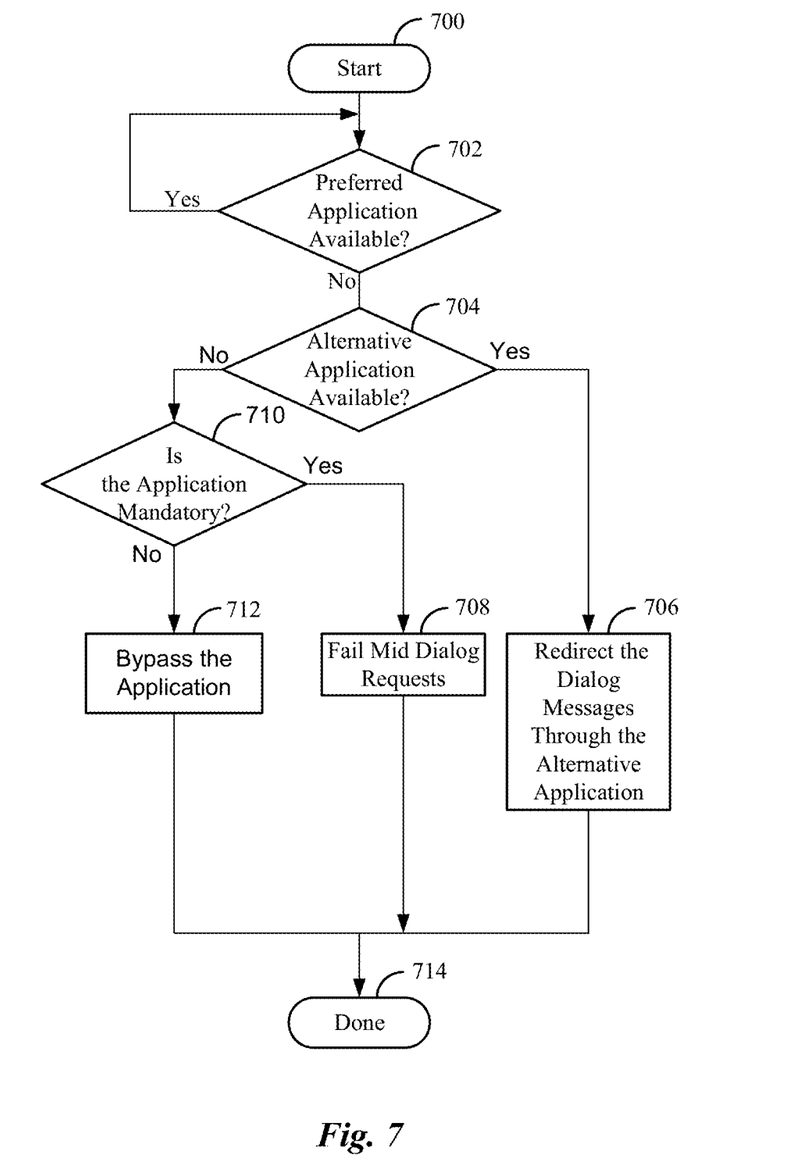
FIG. 7 is a flow diagram of a method for determining how to manage a failover process.

FIG. 7 is a flow diagram of a method for determining how to manage a failover process. The process starts in step 700. In step 702, it is determined if the preferred application is still available. If a preferred application is still available in step 702, the process repeats step 702. If the preferred application is not available in step 702, the process determines if an alternative application is available. If the alternative application is available in step 704, the process redirects the dialog messages through the alternative application and is done 714.

Otherwise, if the alternative application is not available in step 704, the process determines in step 710 if the application is mandatory. If the application is mandatory in step 710, the process fails 708 any mid dialog requests and is done. Otherwise, if the application is not mandatory in step 710, the process bypasses 712 the application and is done 714. Although the process is done in step 714, the process may also go back to step 702 to see if the preferred application later comes available.

Figure 8:
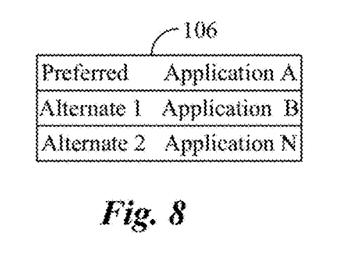
FIG. 8 is a diagram of an application failover domain group name.

FIG. 8 is a diagram of an application failover domain group name 106. The application failover domain group 106 comprises preferred application A and one or more alternative applications. In this example, the application failover group domain name 106 comprises two alternative applications: 1) application B, and 2) application N. If the application A is unavailable, then the system and method will use alternative 1 (application B). If both the application A and the application B are unavailable, the application N will be used.

Of course, various changes and modifications to the illustrative embodiment described above will be apparent to those skilled in the art. These changes and modifications can be made without departing from the spirit and the scope of the system and method and without diminishing its attendant advantages. The following claims specify the scope of the invention. Those skilled in the art will appreciate that the features described above can be combined in various ways to form multiple variations of the invention. As a result, the invention is not limited to the specific embodiments described above, but only by the following claims and their equivalents.

What is claimed is:

1. A method comprising:
   establishing a first Session Initiation Protocol (SIP) dialog between a first SIP device and a second SIP device, wherein the first SIP dialog is established via a session manager and wherein a preferred application is inserted into a communication path of the first SIP dialog, wherein the preferred application is mandatory, wherein the preferred application is a first Back-to-Back User Agent (B2BUA), and wherein the first SIP dialog is redirected through an alternative application;
   while the first SIP dialog is active, detecting that the preferred application is unavailable; and
   responsive to detecting that the preferred application is unavailable, doing at least one of the following (i) and (ii):
   (i) inserting a dialog identifier, a route set, and a contact Uniform Resource Identifier (URI) for a dialog between the second SIP device and the first B2BUA into a message sent between the first B2BUA and the session manager;
   the session manager detecting that the first B2BUA is no longer available; and
   the session manager using the dialog identifier to redirect the first SIP dialog through the alternative application, wherein the alternative application is a second B2BUA; and (ii) inserting the dialog identifier, the route set, and the contact URI for a communication path between the second SIP device and the first B2BUA into a message sent between the first B2BUA and the first SIP device;
the first SIP device detecting that the first B2BUA is no longer available; and
the first SIP device using the dialog identifier, the route set, and the contact URI to redirect the first SIP dialog through the alternative application, wherein the alternative application is a second B2BUA.

2. The method of claim 1, wherein (i) is performed and further comprising the step of inserting a via header for the communication path between the second SIP device and the first B2BUA into the message.

3. The method of claim 1, wherein (ii) is performed and further comprising the step of the first B2BUA inserting a second dialog identifier, a second route set, and a second contact Uniform Resource Identifier (URI) for a communication path between the first SIP device and the first B2BUA into a SIP INVITE message sent between the first B2BUA and the second SIP device.

4. The method of claim 1, wherein the preferred application provides one or more of the following: a caller ID service, a recording service, a call blocking service, a call routing service, and a mid-call announcement service.

5. The method of claim 1, wherein the first SIP dialog is at least one of a voice call, a video call, a multi-media stream, a instant message session, a email communication, and a Real Time Protocol (RTP) stream.

6. The method of claim 1, wherein the preferred application and the alternative application are on different servers.

7. A system comprising:
a session manager comprising a processor and a memory configured to establish a first Session Initiation Protocol (SIP) dialog between a first SIP device and a second SIP device, wherein a first SIP dialog is established via the session manager, wherein a preferred application is inserted into a communication path of the first SIP dialog, wherein the preferred application is mandatory, wherein the preferred application is a first Back-to-Back User Agent (B2BUA), and wherein the first SIP dialog is redirected through an alternative application; and
the first SIP device or the session manager configured to, while the first SIP dialog is active, detect that the preferred application is unavailable and do at least one of the following (i) and (ii) in response to detecting that the preferred application is unavailable:
(i) insert a dialog identifier, a route set, and a contact Uniform Resource Identifier (URI) for a dialog between the second SIP device and the first B2BUA into a message sent between the first B2BUA and the session manager, detect that the first B2BUA is no longer available, and use the dialog identifier to redirect the first SIP dialog through the alternative application, wherein the alternative application is a second B2BUA; and
(ii) insert the dialog identifier, the route set, and the contact URI for a communication path between the second SIP device and the first B2BUA into a message sent between the first B2BUA and the first SIP device, detect that the first B2BUA is no longer available, and use the dialog identifier, the route set, and the contact URI to redirect the first SIP dialog through the alternative application, wherein the alternative application is a second B2BUA.

8. The system of claim 7, wherein (i) is performed and wherein the first B2BUA is further configured to insert a via header for the communication path between the second SIP device and the first B2BUA into the message.

9. The system of claim 7, wherein (ii) is performed and wherein the first B2BUA is further configured to insert a second dialog ID, a second route set, and a second contact Uniform Resource Identifier (URI) for a communication path between the first SIP device and the first B2BUA into a SIP INVITE message sent between the first B2BUA and the second SIP device.

10. The system of claim 7, wherein the preferred application provides one or more of the following: a caller ID service, a recording service, a call blocking service, a call routing service, and a mid-call announcement service.

11. The system of claim 7, wherein the first SIP dialog is at least one of a voice call, a video call, a multi-media stream, a instant message session, a email communication, and a Real Time Protocol (RTP) stream.

12. A method comprising:
establishing a first Session Initiation Protocol (SIP) dialog between a first SIP device and a second SIP device, wherein the first SIP dialog is established via a session manager and wherein a preferred application is inserted into a communication path of the first SIP dialog, wherein the preferred application is a Back-to-Back User Agent (B2BUA), the preferred application is not mandatory, and an alternative application is not available;
while the first SIP dialog is active, detecting that the preferred application is unavailable; and
responsive to detecting that the preferred application is unavailable:
inserting a first dialog ID, a first route set, and a first contact Uniform Resource Identifier (URI) for a communication path between the second SIP device and the B2BUA into a message sent between the B2BUA and the first SIP device;
detecting that the B2BUA is no longer available; and
using the first dialog ID, the first route set, and the first contact URI to bypass the B2BUA, wherein a Request URI is replaced by the first contact URI, a set of Route headers is replaced by the first route set, and a call-ID header, a To tag, and a From tag are replaced by the first dialog ID.

13. The method of claim 12, wherein the preferred application is a proxy application.

14. The method of claim 12, wherein the preferred application is a proxy application, further comprising the step of not redirecting the first SIP dialog through the alternative application in response to the alternative application being unavailable.

15. The method of claim 12, wherein the preferred application is a proxy application, and further comprising the step of redirecting the first SIP dialog through the alternative application if the alternative application is available.

16. The method of claim 12, further comprising the step of the B2BUA inserting a second dialog ID, a second route set, and a second contact Uniform Resource Identifier (URI) for a communication path between the first SIP device and the first B2BUA into a SIP INVITE message sent between the first B2BUA and the second SIP device.

17. The method of claim 16, wherein the second dialog ID further comprises a To header and wherein the TO header is pre-populated.

18. The method of claim 12, wherein the preferred application provides one or more of the following: a caller ID service, a recording service, a call blocking service, a call routing service, and a mid-call announcement service.

19. The method of claim 12, wherein the first SIP dialog is at least one of a voice call, a video call, a multi-media stream, a instant message session, a email communication, and a Real Time Protocol (RTP) stream.

20. The method of claim 12, wherein the preferred application and the alternative application are on different servers.

* * * * *